Dec. 16, 1958 G. WANINGER 2,864,907
SUPPORTING MEANS FOR FLEXIBLE MEMBERS
Filed Dec. 22, 1954 2 Sheets-Sheet 1
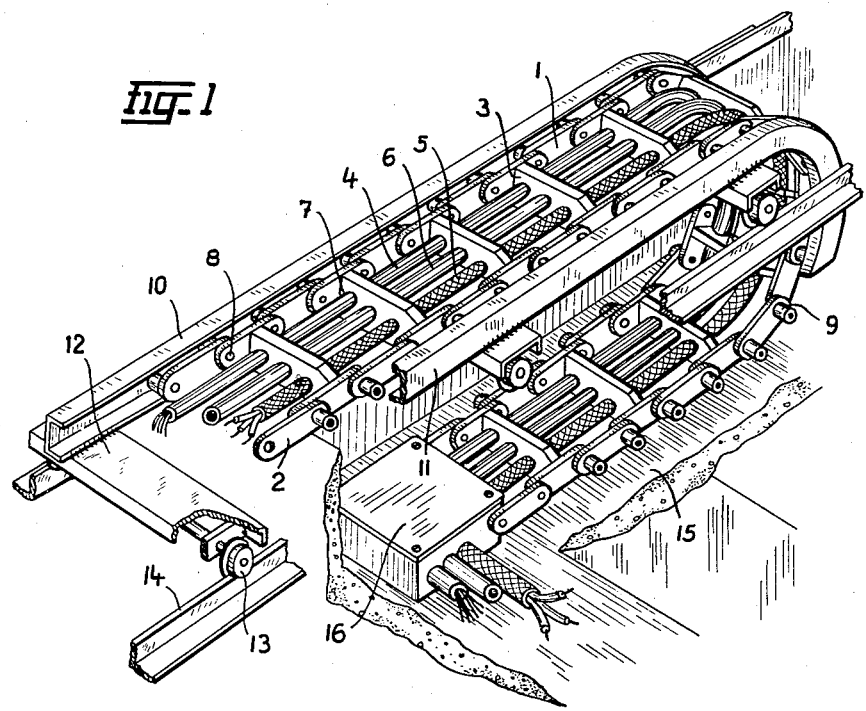
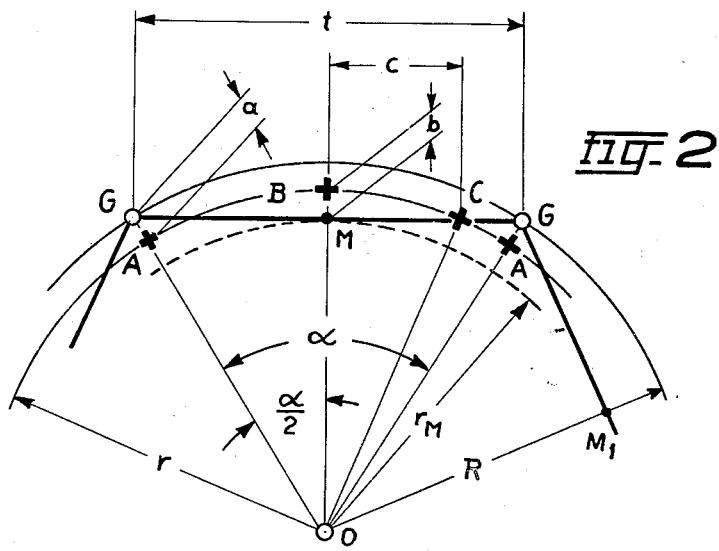
INVENTOR.
G. Waninger
BY
Glascock Downing & Seebold
Attys.

Dec. 16, 1958 G. WANINGER 2,864,907
SUPPORTING MEANS FOR FLEXIBLE MEMBERS
Filed Dec. 22, 1954 2 Sheets-Sheet 2
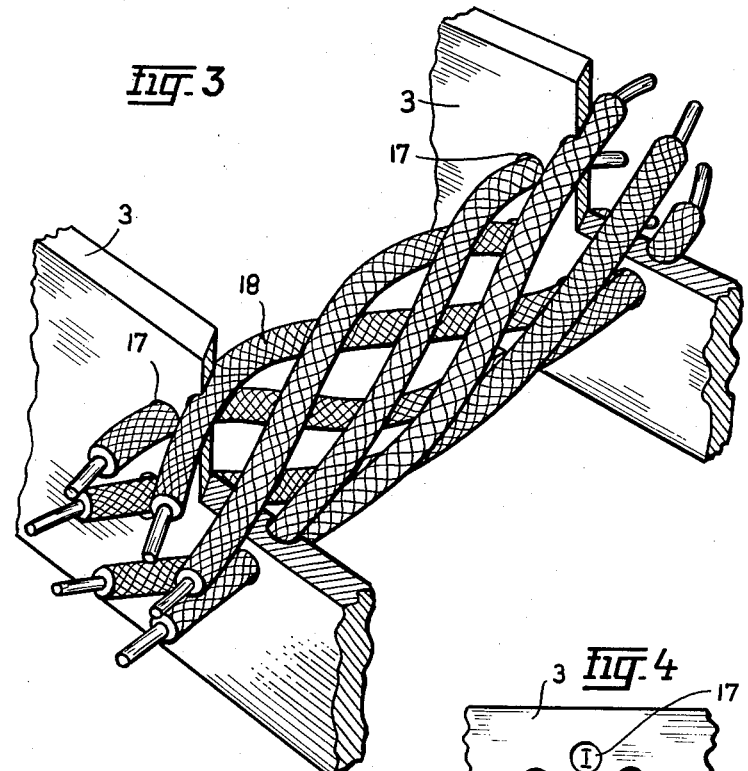
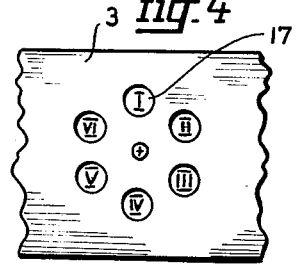
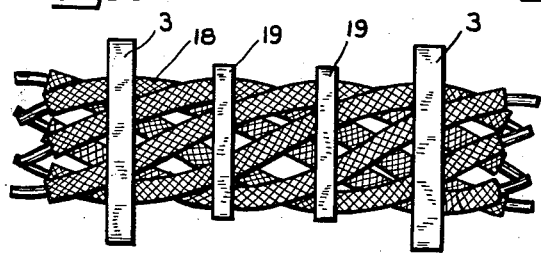
INVENTOR.
G. Waninger

United States Patent Office 2,864,907
Patented Dec. 16, 1958

2,864,907

SUPPORTING MEANS FOR FLEXIBLE MEMBERS

Gilbert Waninger, Siegen, Westphalia, Germany

Application December 22, 1954, Serial No. 477,045

Claims priority, application Germany January 13, 1954

13 Claims. (Cl. 191—12)

A supply of electric current, gaseous or liquid media to operable elements such as movable machine parts, particularly those movable in straight lines, for example slides on machine tools, travellers on overhead cranes, often presents difficulties if a plurality of electric conductors or flexible pipes, for example for compressed air, water and oil, are necessary. The difficulties are increased if the length of travel of such machine parts is considerable.

The present invention dispenses with sliding electric contacts on account of the difficulty of providing protection against accidental contact and it dispenses with jointed connections, for example for air, water, oil and the like on account of difficulties of preventing leakage. An important object of the present invention is to provide an arrangement in which at one end electric cables, hosepipes or the like form fixed connections and the other ends are carried by the movable machine part. The cables or hoses which are moved along by the machine part and, which must not be bent or curved more sharply than a certain predetermined value which may be conveniently expressed as the permissible radius of bending, serve solely for conveying the current or other media and to increase their security of operation and their life, are relieved of all other loads for example of tensile or compressive stresses, flattening of the cross-section through kinking, and their own weight. Further, exposure to sliding or friction is avoided and protection given against other mechanical damage.

According to the invention the object is achieved by the employment of link chains as carrying elements for the cables or flexible pipes, though it will be understood that the bending stresses in the cables or flexible pipes themselves due to the necessary bending naturally cannot be prevented or relieved. Nevertheless the bending stresses in the sables and the curvature of the chains can be uniformly distributed by constructing the chains so that they compel the cables and flexible pipes to undergo circular curvature. By suitable construction of the chain the radius of curvature can be prevented from falling below a desired minimum value which corresponds to the permissible arcuate configuration into which the members may be safely bent, said minimum value being greater than the permissible minimum radius of curvature or bending of the cables and flexible pipes.

The carrying chains according to the invention are so constructed that the cables and flexible pipes carried thereby are carried in the neutral zone of the chain, that is, in the zone which when the chain is curved does not undergo any change in length, in order to reduce relative endwise movement between the cables and hosepipes and the chain to as small a value as possible.

The invention will be further described with reference to the accompanying drawings.

Fig. 1 is a perspective view of a preferred embodiment of the present invention.

Fig. 2 is a diagram illustrating certain relationships between the dimensions of the parts.

Fig. 3 is a detail of one way of supporting a plurality of electric conductors according to the invention.

Fig. 4 is a front view of one of the spacing members used in Fig. 3; and

Fig. 5 is a plan view of part of the arrangement illustrated by Fig. 3.

An example of a preferred embodiment of a supporting chain in accordance with the invention is shown in Fig. 1. The chain comprises two simple link chains 1 and 2, of which alternate links are connected together by vertical cross members 3. The cross members 3 are provided with bores 7 to receive the flexible members to be supported, here exemplified by electric cables 4 and 5 and a flexible pipe 6, the axes of which lie in the surface defined by the axes of the chain pivots, that is, in the neutral zone of the chain.

On each pivot 8 of the chains 1 and 2 there are external guide rollers 9 which run in U-section guide rails 10 and 11 which near one end bend through 180° with a radius corresponding to the permissible bending of the flexible members 4, 5, 6 so that the chains 1 and 2 with the flexible members 4, 5, 6 are positively held to this radius, where the rollers 9 traverse these curved parts of the guide rails 10, 11.

The guide rails 10 and 11 are connected together at a spacing corresponding with the total width of the chain by cross supports 12. On the underside of these cross supports are rollers or wheels 13 which run on carrying rails 14 and take the weight of the whole chain and the guide rails 10 and 11.

The lower run of the supporting or carrying chain extending from the guide rails 10 and 11 rests on a flat surface 15 and is attached at one end to a fixed junction box 16. The upper run of the carrying chain supported in the guide rails 10 and 11 is secured to the operable element or machine part, here not shown, which is to be supplied with electrical energy and fluid through the flexible members 4, 5, 6.

If now the carrying chain by corresponding movement of the machine part (for example the carriage of a lathe) is moved to the right, the chain is bent through the radius of curvature of the guide rails 10 and 11 and is laid down onto the surface 15. As the curvature of the chain must also be displaced to the right, the rails 10 and 11 supported on the wheels 13 will also be carried to the right but by a distance equal to half the amount of the movement of the machine part. The motion is correspondingly reversed when the machine part moves to the left. The movement of the guide rails 10 and 11 is caused by the chain and the speed of the rails can be controlled by varying the size of the wheels 13.

The carrying chain thus achieves the object of guiding the cables and flexible pipe, of holding them together in a closed relationship, of taking tensile and compressive forces and of protecting the flexible members from friction or rubbing. The weight of the carrying chain and the flexible members is taken up by the guide rails 10 and 11 and thence transmitted to the supporting track means or carrying rails 14. The carrying chain and thus the flexible members cannot assume a curvature other than the circular arc curvature determined by the guide rails.

Apart from supporting cables and flexible pipes the carrying chain can also be used for guiding and supporting flexible shafts, jointed shafts, cullises or even conveyor chains or bands if suitably constructed.

As in passing through the curved parts of its path the carrying chain is bent into polygonal form while the cables and flexible pipes are bent through a fairly exact circular arc, in spite of supporting the flexible members in the neutral zone a certain relative sliding may be unavoidable. If however the chain is only bent through a single radius of curvature which suffices in nearly every case, the supporting points for the flexible members can be so selected that relative sliding is completely avoided.

Fig. 2 shows the geometrical relationships for determining the neutral points of support for a given chain link length $t$ and a radius of curvature R.

If the flexible member is supported at the link pivot points G the circular arc GG described by the flexible member is longer than the chain link length, that is, the flexible member would be stretched when bent in this way. If the flexible member is supported at the midpoints M and $M_1$ of the links the arc $MM_1$ would be shorter than the chain link length $t$, that is in this case the flexible member would tend to be compressed and to push its way out of the chain. If, however, the flexible member is supported at the points AB or C the cable arc AA will have the same length as the chain links $t$. Relative sliding must therefore be reduced to zero. The positions of the points A, B and C is given from the simple geometrical relationships.

$$a = R - \frac{t \cdot 180}{\pi \cdot \alpha} \sin \frac{\alpha}{2} = \frac{t}{2R}$$

$$b = t \left( \frac{180}{\pi \cdot \alpha} - \frac{1}{2 \tan \frac{\alpha}{2}} \right)$$

$$c = t \sqrt{\left(\frac{180}{\pi \cdot \alpha}\right)^2 - \frac{1}{4 \tan^2 \frac{\alpha}{2}}}$$

Mathematically there is an unlimited number of neutral points of support, namely, all those which lie on circular arcs for the flexible member having the length $t$ and being fixed to the chain links, of which A, B and C are most advantageous from the constructional point of view.

If a number of electrical conductors are to be carried as one flexible member by the chain, they do not need to be laid up into a cable but can be separately drawn through the chain. If a sufficiently great number of spacing members are used the employment of bare conductors becomes possible. In that case, the distance pieces and the cross members 3 will need to be of insulating material or have inserted insulation where the conductors pass through. As can be seen from Fig. 2, the reference character $\alpha$ denotes the angle between pivot points G, whereas $r_M$ is the length of the radius taken from point O to the mid-point M of the link.

Fig. 3 is an example showing how individual conductors can be arranged in the carrying chain.

The cross members 3 shown in Fig. 3 which connect the two chains 1 and 2 in Fig. 1 are provided with individual inclined bores or apertures 17, one for each of the individual conductors. The bores 17 are arranged in circular formation as shown in Fig. 4, in particular conductor 18, which passes for example through the bore I in one of the cross members 3, is carried through the diametrically opposite bore IV in the next cross member 3 and so on for all the others. The conductors are, however, not carried directly from one bore to the next but curve through the inclined bores 17 around the midpoint O so that each follows a helical path as shown in Figures 3 and 5.

By this means, relative sliding of the individual conductors 18 in the bores 17 is avoided, since the midpoint O corresponds to the neutral supporting point for the flexible member constituted by the complete group of conductors.

Finally, spacing members 19 can be arranged between the cross members 3 as shown in Fig. 5. Their function is to hold the individual conductors 18 at a predetermined distance apart. The number of spacing members 19 of which two are shown in Fig. 5 can be as desired up to the maximum permitted by the thickness of these members and the distance between the cross members 3.

It will be understood that the use of distance pieces is not confined to helically arranged individual electric conductors. Such additional spacing members can be used between the cross members 3 in any form of the invention.

What I claim is:

1. A supporting device for flexible members having a predetermined permissible radius of bending, comprising a stationary supporting track extending in a straight line path, a pair of parallel spaced movable rail means including guide means disposed on said supporting track, means in registry with said rail means for imparting movement to the latter along said supporting track, said rail means including a straight portion and a curved portion and having said straight portion extending parallel to said straight line path of said supporting track and said curved portion curved through substantially 180 degrees with respect to said supporting track to define a predetermined arcuate configuration having a radius not less than the permissible radius of bending of said members adapted to be supported by said rail means, a carrying chain supported between said rail means and guided by said guide means, at least one flexible member carried by said carrying chain and having a first portion extending parallel to and in the longitudinal direction of said carrying chain and a second portion flexed through substantially 180 degrees, said rail means including said guide means ensuring that said predetermined permissible radius of bending of said flexible member is not exceeded.

2. A supporting device according to claim 1, including roller means supported by said carrying chain and extending into said guide means of said rail means whereby said chain is guided by said rail means.

3. A supporting device according to claim 1, including wheels carried by said rail means and supported on said supporting track.

4. A supporting device according to claim 1, wherein said carrying chain comprises two similar parallel spaced link chains and cross members joining links of said chains, said cross members having apertures therein in which said members are supported.

5. A supporting device according to claim 1, wherein said members are supported in a neutral zone of said carrying chain, said neutral zone being the zone in which when the chain is curved the same does not undergo any change in length.

6. A supporting device as set forth in claim 1 wherein said members include bare electric conductors and said carrying chain comprises two similar parallel spaced link chains, cross members joining links of said chains and having bores through which said members are guided, and means insulating said bare conductors from any conductive parts.

7. A supporting device as set forth in claim 6 wherein said cross members are made of electrical insulating material.

8. A supporting device as set forth in claim 7 including insulating spacing members wherein said bare conductors are spaced and guided at points intermediate said cross members.

9. A supporting device for flexible members having a predetermined permissible radius of bending, comprising a stationary supporting track extending in a straight line path, a pair of parallel spaced movable rail means including diametrically opposed channel means disposed on said supporting track, means in registry with said rail means for imparting movement to the latter along said supporting track, said rail means including a straight portion and a curved portion and having said straight portion extending parallel to said straight line path of said supporting track and said curved portion curved through substantially 180 degrees with respect to said supporting track to define a predetermined arcuate configuration having a radius not less than the permissible radius of bending of said members adapted to be supported by said rail means, a carrying chain supported between said rail means and guided by said channel means, at least one flexible member carried by said carrying chain and having a first portion extending parallel to and in the longitudinal direction of said carrying chain and a second portion flexed through substantially 180 degrees, said rail means including said guide means ensuring that said predetermined permissible radius of bending of said flexible member is not exceeded.

10. A supporting device as set forth in claim 9, wherein said carrying chain comprises a pair of similar parallel spaced link chains respectively guided in said channel means, cross members joining the inner links of said chain and provided with bores therein through which the flexible members are threaded.

11. A supporting device as set forth in claim 9 wherein said cross members are spaced so that said flexible members are supported in the neutral zone of said chains, said neutral zone being the zone in which when the chain is curved the same does not undergo any change in length.

12. A supporting device as set forth in claim 9 also comprising rollers on the pivots by which the links of said chains are pivoted together.

13. A supporting device as set forth in claim 9, wherein said bores disposed in each cross member are inclined and distributed in a circular formation, said flexible members being threaded through said bores and arranged in helical formation so that each flexible member extends from one bore located in one cross member to another diametrically opposite bore disposed in another adjacent cross member.

References Cited in the file of this patent

UNITED STATES PATENTS

| | | |
|---|---|---|
| 1,822,475 | Burke | Sept. 8, 1931 |
| 2,201,954 | Flygare | May 21, 1940 |